Oct. 19, 1965     W. McKINLEY MARTIN     3,212,674
LIQUID METERING AND MIXING DEVICE
Filed March 6, 1963     3 Sheets-Sheet 1
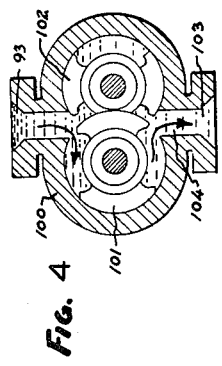
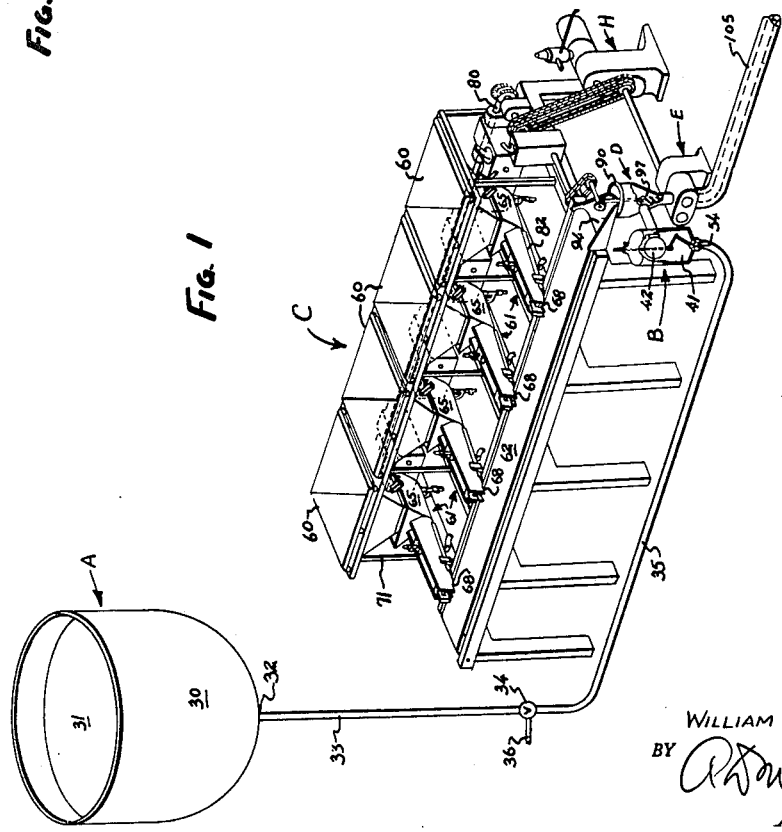
INVENTOR.
WILLIAM McK. MARTIN
BY
ATTORNEY Oct. 19, 1965    W. McKINLEY MARTIN    3,212,674
LIQUID METERING AND MIXING DEVICE
Filed March 6, 1963    3 Sheets-Sheet 2
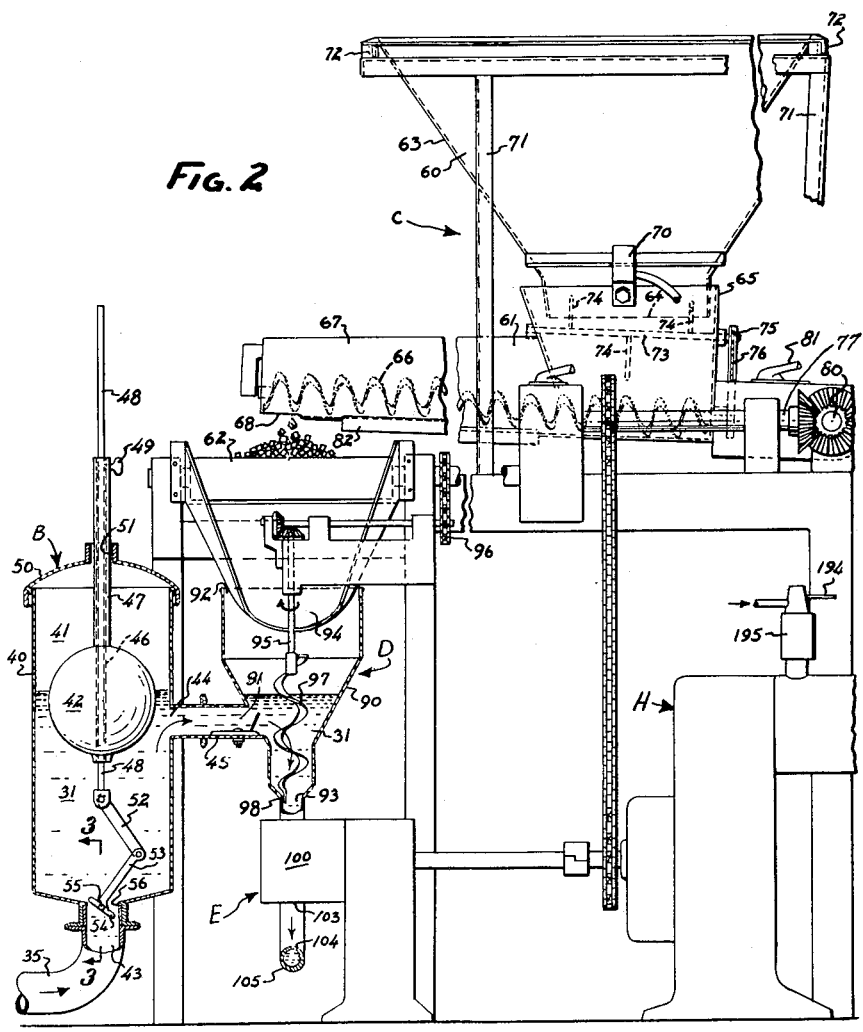
Fig. 2
Fig. 3
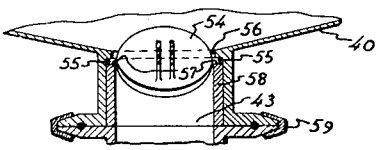
INVENTOR.
WILLIAM McK. MARTIN
BY
ATTORNEY

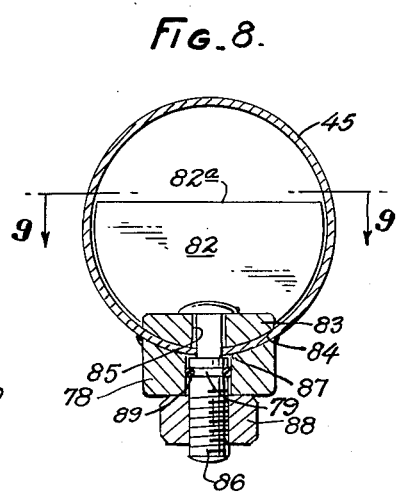
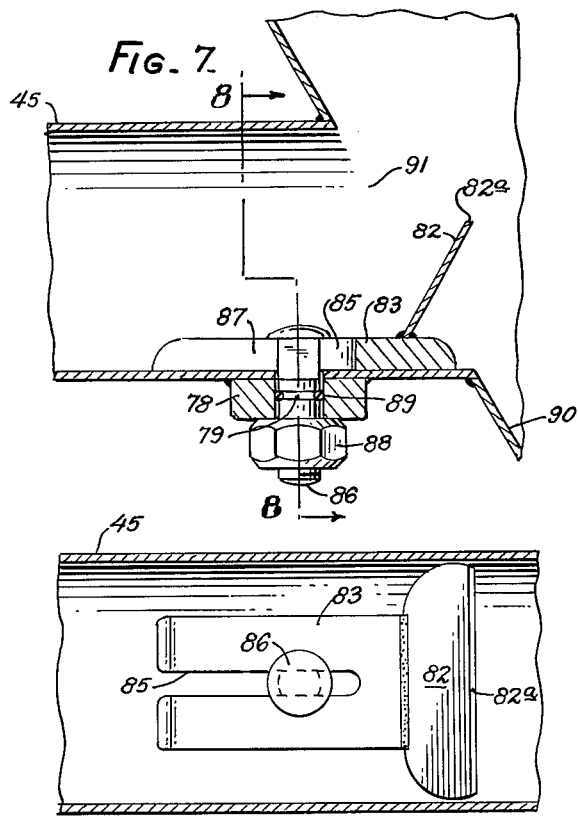
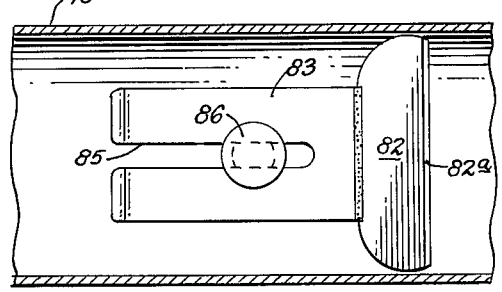
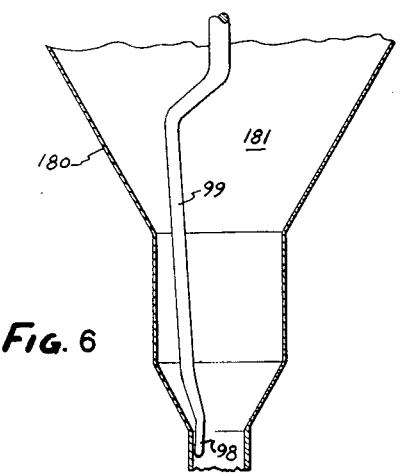
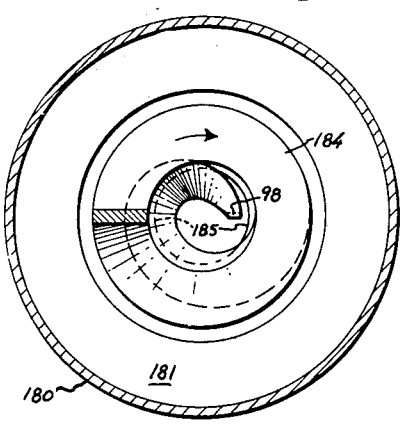

United States Patent Office 3,212,674
Patented Oct. 19, 1965

3,212,674
LIQUID METERING AND MIXING DEVICE
William McKinley Martin, 457 Virginia Ave.,
San Mateo, Calif.
Filed Mar. 6, 1963, Ser. No. 263,155
9 Claims. (Cl. 222—67)

The invention relates to an improved apparatus for metering and mixing sizable particles of food with metered amounts of a liquid foodstuff.

This application is a continuation-in-part of application Serial Number 171,548, filed January 8, 1962, now abandoned, which was a division of my application Serial Number 108,697 filed March 30, 1961, now abandoned, which was a division of my application Serial Number 845,744 filed October 12, 1959, now Patent 3,041,185, which was a continuation-in-part of my application Serial Number 759,098, filed September 4, 1958, now abandoned, which was a continuation-in-part of my application Serial Number 546,306, filed November 14, 1955, now abandoned.

A very important object of the present invention is to prevent disintegration, attrition, or mushing of the solid components in the food product while assuring their accurate measurement and their blanching.

Another important object of the invention is to provide for the continuous production of canned fluid or semi-fluid food products containing solid pieces of having better flavor, color, texture, and uniformity than can be produced by conventional canning methods. The invention can also be use to produce semiliquid canned products of improved quality.

Although the apparatus and methods of this invention will be described in connection with an aseptic canning system, many features are useful elsewhere in other food and chemical processing systems; so the invention is not to be interpreted as confined too narrowly.

Other obejcts and advantages of the invention will appear from the following description of a preferred embodiment, and of some modifications.

The present invention performs the operations of (1) mixing metered amounts of precooked or blanched solid constituents into a liquid phase of the product and (2) feeding the mixture uniformly to a pumping stage, whence the mixture passes into and through a product heater, a temperature holding tube, and a cooling system, to a filler, uniform distribution of the solid components in the mixture being maintained throughout these operations.

In the drawings:

FIG. 1 is an isometric and partly diagrammatic view of a portion of an aseptic canning apparatus embodying the principles of the invention. Some parts are broken away and shown in section, to disclose other parts.

FIG. 2 is an enlarged view in elevation and partly in section of the apparatus for metering the liquid component of the food to be canned, for metering and blanching the solid components, for mixing them together and pumping them through the remainder of the system. Some parts are broken off or broken apart to conserve space.

FIG. 3 is a fragmentary enlarged view of elevation and in section of the butterfly valve, taken along the line 3—3 in FIG. 2.

FIG. 4 is a view in elevation and in section of a pump suitable for use in this invention.

FIG. 5 is an enlarged view in horizontal section of a modified form of mixing hopper.

FIG. 6 is a view in elevation and in section of a portion of a modified form of antibridging device that may be used in the mixing device of FIG. 2 or FIG. 5. FIG. 6 is on an enlarged scale with respect to FIG. 2.

FIG. 7 is a fragmentary enlarged view in elevation and in section of a portion of FIG. 2 showing the deflection plate at the exit of the horizontal conduit into the mixing chamber.

FIG. 8 is a view in section taken along the line 8—8 in FIG. 7.

FIG. 9 is a view in section taken along the line 9—9 in FIG. 8.

A liquid-supply unit A (FIG. 1) feeds the liquid phase of a product to be canned to a liquid-metering unit B. Meanwhile, a solids supply, metering, and blanching unit C feeds various measured amounts of particulate or solid components into a mixing device D, where the solids are added to and mixed with the liquid. From there, the mixture is forced by a pump E through the remainder of the system.

*The liquid supply unit A (FIG. 1)*

The liquid supply unit A may comprise a steam-jacketed kettle 30 which contains a liquid food component 31. The steam-jacketed kettle 30 may preheat or even precook the liquid 31 to any desired temperature, usually below 212° F. For that matter, for some uses the liquid 31 may be at the ambient temperature in an unjacketed supply tank. An outlet 32 at the lower end of the kettle 30 may lead into a vertical pipe 33, for gravity supply is desirable in the steps preceding the pump E. However, a pump may be used here in connection with a recirculating by-pass, if desired. The vertical pipe 33 preferably leads through a three-way valve 34 to a pipe 35 which leads into the liquid metering unit B. The three-way valve 34 is used during the presterilization of the aseptic canning system, at which time the valve 34 closes off the pipe 33 from the pipe 35 and connects the pipe 35 to a water pipe 36.

*The liquid-metering unit B (FIG. 2)*

The liquid-metering unit B includes a generally cylindrical housing 40 providing a float chamber 41 in which is mounted a float 42. The chamber 41 has a bottom inlet 43 connected to the pipe 35 and also has a radial outlet 44 part way up one side, lower than the desired level of the liquid 31 in the chamber 41. From the outlet 44 a generally horizontal conduit 45 leads into the mixing device D. The liquid 31 will, of course, have substantially the same level in both the chamber 41 and the mixing device D, but it is slightly higher in the float chamber 41 in order to help to produce an upward flow in the device D of the liquid coming from the conduit 45. The float chamber 41 is of sufficient capacity to give an even flow of liquid through it, resulting from the gravity head of the kettle 30 (or pump pressure, if a pump is used before the unit B), and for the same reason has an adequate clearance from the float 42. In a typical apparatus the chamber 41 may be 8" in diameter and the float 7" in diameter.

The float 42 is provided with a diametral tube 46 having an extension 47, which enables the float 42 to be slidably mounted on a rod 48. A thumb screw 49 makes it possible to fasten the float 42 at any desired height on the rod 48. The housing 40 has a cover 50 with an oversize, bossed axial opening 51, that serves as a guide for the rod 48 or extension 47. There is plenty of clearance between the tube extension 47 and the opening 51, to enable the escape of any entrained air, and air can also escape from the mixing device D, which is open to the air, for in neither is pressure allowed to build up.

The lower end of the rod 48 is pivotally attached to a linkage arm 52, which in turn is pivotally connected to a second arm 53. A thin, round butterfly valve 54 is mounted on the lower end of the arm 53, and both are pivotally attached to the housing 40 by a pair of pivot pins or bearings 55, which are axially in line with the rod 48 and the opening 51. The inlet 43 is provided with a valve opening 56 in which the butterfly valve 54 moves to throttle the flow. The butterfly valve 54 is, in principle and construction, hydrostatically balanced. Hence it is easily actuated by the float 42 at all liquid levels in the kettle 30 and at all liquid pressures in the pipe 35.

To facilitate easy and thorough cleaning, the butterfly valve 54 is preferably made in the sanitary design illustrated in FIG. 3. The valve 54, a thin metal disc, is mounted between the two bearings 55, which are exactly 180° apart. The bearings 55 are held in position in rounded notches 57 in a sleeve 58. The valve 54 can be readily removed, after removal of the cover 50 and float 42, by releasing a clamp 59 and sliding the sleeve 58 out from the housing 40, along with the rod 47 and the linkages 52 and 53.

As the float 42 rises, it moves the levers 52 and 53 to close the butterfly valve 54 and thereby to reduce the flow of liquid 31 past the opening 56. When the float 42 reaches a certain height, the butterfly valve 54 will close the opening 56, and the supply of liquid 31 will be practically cut off. When the liquid level drops, the float 42 opens the valve 54. The float valve 42 thus meters the flow of the liquid 31 from the kettle 30 to the mixing device D and the pump E; it prevents the mixing device D from either overflowing or running empty and assures a level that enables good mixing of the liquid with the solids coming from the unit C.

*Solids supply, metering and blanching unit C (FIGS. 1 and 2)*

As shown in the drawings, the metering and blanching unit C for solids includes a series of hoppers 60, one for each solid ingredient, a metering device 61 at the lower end of each hopper 60, and a single conveyor belt 62 on which all the metering devices 61 mete out their ingredients and which carries them to and dumps them into the mixing device D.

The solid constitutents to be measured out may be such things as cubed or sliced vegetables (e.g., potatoes, celery, carrots, onions), whole small vegetables (e.g., beans, peas, and small onions), and meat (e.g., cubed beef or slices of ham); the cubes may be about ⅜" or ½" on a side, or whatever size one wishes them, the cutting being done in any desired manner. If desired, any of these ingredients may be precooked or sautéed. Once prepared, the solid constituents are placed into their respective hoppers 60. Further description of a suitable unit C, to which the present invention is not, however, confined, will be found in application Serial Number 108,697, filed March 30, 1961.

Each hopper 60 is substantially identical in design and operation, but there may be such variations as are desirable to accommodate different products. As shown, each hopper 60 has a sloping wall 63 and an open lower end 64 which opens into a hopper-like housing portion 65 of the metering device 60. At the bottom of each metering device 60 is a preferably hollow screw 66 which is rotated so as to move the material out of the housing portion 65 and through and along a trough 67. The trough 67 is preferably semicircular in cross-section with its sides extending a substantial distance above the screw 66 and both its sides and bottom spaced from the screw 66 enough to protect the solid components from damage. The speed of the screw 66 determines the rate at which food particles are dispensed onto the belt 62 through an opening 68 in the outer end of the trough 67. To help enable blanching, the trough 67 is preferably tilted so that the screws 66 has to carry the material upwardly out of the housing 65.

The hopper 60 is preferably equipped with a vibrator 70 of any suitable type; e.g., it may be mechanical, electrical, or pneumatic. The vibrator 70 prevents the solid constituents from sticking to the sloping walls 63 of the hopper 60. It may be aided in its function by having the hopper 60 rest on a frame 71 through flexible or rubber supports 72, and by its having its lower end 64 free to move.

Mounted immediately above the screw 66 in the housing 65 is a shaft 73 on which are mounted a series of curved rods 74. The ends of the rods or fingers 74 preferably extend as close as possible to the housing and hopper walls, while still clearing them. On a one-foot shaft 73, three or four rods 74 spaced apart and set at different rotative positions on the shaft 73 are sufficient, and too many are undesirable, acting like a paddle. When the shaft 73 is rotated, the rods 74 revolve and prevent the product from caking or lodging and from bridging over the lower end 64 of the hopper 60. Preferably, the shaft 73 is rotated slightly slower, and at least no faster, than the screw 66. This may be done by driving it through a reduction gear 75 and chain 76 from a drive shaft 77 that drives the screw 66. Although the vibration of the sloping hoppers 60 is sufficient to cause most materials to flow freely into the metering device 61, some foods such as lasagne tend to stick together if compressed; without the revolving rods 74, the lasagne tended to bridge over the end 64 and the hollow rotating screw 66 would then not receive any lasagne but would run empty.

It will be apparent from the foregoing description and from the drawings that the metering screw 66 actually measures the material and that the speed at which the screw 66 turns determines the rate at which the material is fed to the belt 62. All the screws 66 are preferably driven by the same variable-speed motor H, which also drives the input pump E, all the screws 66 preferably being driven from the same main drive shaft 80. In addition, each screw 66 has a separate variable transmission unit with a calibrated control knob 81 for varying its individual speed. This makes it possible to adjust the metering rates of the various screws 66 relative to each other individually while at the same time driving all of them from the same motor H, whose speed is itself regulated in a manner to be explained later.

The conveyor belt 62 is preferably driven at a fairly high speed, so that the solid food components from the various metering units 61 are discharged in a continuous stream into the mixing device D. If the belt 62 moved too slowly, the solid components would build up and be discharged unevenly into the device D. Hence, the belt 62 moves faster than the material can be piled up on it; how much faster is not critical.

As stated earlier, the food solids are blanched or preheated as they move through the metering unit 61. For this purpose, the trough 67 in which the screw 66 moves is tilted upwardly toward its outlet 68. Saturated steam or hot water or hot solutions of suitable composition may be used to provide the blanching heat. For this purpose, steam may be supplied to a tube 82 secured to the bottom of the trough 67, and pass into the trough 67 through suitable openings. As the steam condenses in the unit 61, a hot water bath may be provided, or, for a steam blanch, all the water may be drained out as it condenses. Since the temperature is never higher than 212° F., blanching time is usually not too critical, unless it lasts so long that it overcooks the food.

*The mixing device D (FIGS. 1 and 2)*

The mixing device D comprises a funnel or housing 90 having a side inlet 91 connected to the conduit 45, an open upper end 92, and a bottom outlet 93, which preferably is also the inlet to the input pump E. Solid material falls from the belt 62 directly or down a chute 94 which ends below the open top 92 of the funnel 90, and liquid passes through the conduit 45 into the inlet 91. The liquid flow rate and its level are determined by the float 42, while the solid components falling from the belt 62 are metered by the unit C.

Adjacent the inlet 91 (see FIGS. 7–9) an inclined generally elliptical deflection plate 82 with a horizontal upper edge 82a is supported upon the flat upper surface of a horizontal plate 83 that has an arcuate lower surface 84 fitting the inner periphery of the conduit 45. A slot 85 in the plate 83 enables adjustment of the plate 83 toward and away from the inlet 91. A threaded screw 86 extends through the slot 85 and through a close fitting opening 87 in the conduit 45. The plate 83 is held in any desired position by tightening a nut 88 onto the screw 86. An O-ring 89 in a groove 79 in the screw 86 engages a boss 78 welded to the conduit 45 and thereby prevents leakage.

The purpose of the deflector plate 82 is to cause the liquid 31 to flow upward as it comes through the inlet 91 and then to flow down again, to carry with it solids which might otherwise accumulate on or at the surface. Without the deflector plate, it has been found that the liquid entering the funnel 90 tends to flow directly to the pump inlet 93, bypassing many of the solid particles. Thus, the inlet 91 can be below the surface level of the liquid in the funnel 90, so that the float chamber level is controlled by the funnel level, while at the same time the solids are properly dispersed into the liquid and carried by it. The slotted plate 83 enables adjustment of the deflector 82 to accommodate changes in the flow rate of the liquid; for the clearance between the inlet and the deflector 82 should be less when the flow rate is 10 gallons per minute than when it is 25 gallons per minute.

The device D not only performs the function of mixing the solid components with the liquid 31 as the liquid flows continuously into the input pump E, but performs the very much more important function of preventing the solid components from accumulating and bridging over the funnel outlet and pump inlet 93. Actually, the mechanical operation of mixing the solid components with the liquid is simple compared with the antibridging function of this apparatus.

An axial vertical shaft 95 is provided together with driving means 96, which may be, as shown, connected to the motor H, to rotate it at about 40–60 r.p.m. Too fast a speed tends to disintegrate the solids while too slow a speed provides neither adequate mixing nor adequate disbridging. On the shaft 95 is mounted a preferably hollow screw 97 having a descending helical thread terminating in a vertically downwardly extending, radially offset tip 98. This vertically depending tip 98 is an important element of the invention, for without it solid constituents such as cubed potatoes, carrots, beef, and the like soon bridge over the small outlet 93, which is also the pump inlet, and build up a pad or mat of solid constituents. The liquid would be sucked or drawn through the solids, and there would be no distribution of the solids. The solids would continue to build up until they overflowed the funnel 90.

The offset tip 98 of the hollow screw 97 revolves in a circle around and close to the inside wall of the inlet 93 to the pump E. The tip 98 is slender and tapered so as to leave as much free space as possible for the converging flow of solids and liquid into the pump E. The circular movement of the tip 98 around and close to the inside wall of the inlet 93 effectively dislodges the solid components which tend to bridge and close the inlet 93. If the tip 98 lay along the axis of the screw 97 and were concentric with the pump inlet 93, it would not dislodge bridged solid components; in fact, it would actually aggravate this problem, because it would leave an annular opening with the rod tip as an obstruction in the center instead of a free round opening. The tip 98 need not necessarily extend inside the opening 93, except for mechanical guidance. It must, however, be positioned sufficiently close to the inlet rim of the opening 93 to dislodge any bridged solid components. For pratical mechanical reasons, the tip 98 preferably extends about ¼" inside the inlet 93.

Although circular motion of the tip 98 is preferable, oscillatory motion in a plane or arc has been used quite successfully. In fact, an oscillating or slowly swinging ⅛" diameter stainless steel rod 99 (see FIG. 6) with a tip 98 has been used to prevent bridging of solids at the pump inlet 93.

Referring to FIG. 2, it will be seen that the open screw 97 is of steep pitch and of such dimensions that there is ample space for free flow of solids and liquid irrespective of the movement of the screw 97. This construction is used in order not to compress or compact the solid components. The hollow screw 97 provides a larger opening, more free space, for the free flow or movement of the mixture and damages the solids less than would a solid screw. The open screw 97 thus functions more as a revolving spiral stirrer than as an actual conveyer screw. A spiral rod with tapered tip may be used, if desired, in place of the screw 97, though the flattened screw is more effective in stirring and mixing the solid components into the liquid and tends to urge or gently impel the mixture downward into the pump without damaging the solid components. Thus, the open screw 97 gently stirs the mixture while at the same time impelling it downward into the inlet 93 of the pump E, where its slender tapered tip 98 moves in a circle and prevents bridging of solid components, as already explained.

The liquid level in the mixing funnel 90 is maintained only high enough to facilitate effective mixing of the solids with the liquid. If the level is too high above the inlet 91, the larger volume of liquid will not be as effectively stirred by the revolving screw 97. The solid components would not, in this case, be as evenly mixed with the liquid flowing through the bottom part of the mixing funnel 90. If, on the other hand, the level of liquid in the mixing funnel 90 were maintained at too low a level, there would be danger of air being drawn into the pump E along with the product mixture. The proper level has been found to be slightly above the inlet 91.

*The input pump E (FIGS. 1, 2, and 4)*

The input pump E is a suitable type of positive-displacement pump driven by a variable-speed motor H. It should be capable of pumping liquid products at pressures up to about 80 to 100 pounds per square inch and capable of operation without chopping or mechanically disintegrating the relatively soft food solids. It is a valveless pump, for valves tend to crush, cut, or chop the product. One such pump is shown in FIG. 4. It has a housing 100, a pair of twin-lobed impellers 101 and 102 and an outlet 103. Single lobe impellers are also satisfactory. Such pumps are made by Waukasha Foundry Company and by Creamery Package Company. Alternatively, a Robbins and Myers Moyno pump may be used.

The pump E feeds the mixture 104 into the pipe 105 and on through the system to the point where the filler dispenses the mixture 104 into suitable containers.

*An alternative form of housing (FIG. 5)*

FIG. 5 shows a housing 180 providing a chamber 181. Depending from the top of the chamber 181 is a shaft at the lower end of which is a hollow screw 184 like the screw 97 in the mixing device D in construction and operating in exactly the same manner and for the same purpose, that is, for assuring the transmission of the mixture of materials and with a tip 98 that prevents bridging of the outlet 185 and crushing, mangling, or injuring the solid particles.

*Operation*

In normal operation, a liquid food component 31, preheated in the kettle 30 to any desired temperature, flows by gravity through the pipe 33, the valve 34, and the pipe 35 into the housing 40. Thence it flows via the conduit 45 and funnel 90 to the pump E. The desired level is maintained by the float 42 and its action on the butterfly valve 54, which closes as the liquid level rises and opens as the liquid level drops.

Meanwhile, solids in the hopper 60, kept from sticking to the walls by the slowly rotation well-spaced rods or fingers 74, fall into the metering device 61, where the screw 66 feeds them uphill through a balancing solution or bath or steam. Steam, if used, enters the trough 67 through orifices in the tube 82. The blanched solid components are metered by the screw 66, whose speed and therefore measure is determined by the speed of the motor H and by the local transmission on each screw drive shaft 77. The measured solids fall through the outlet 68 onto the belt 62 and are carried to the chute 94, whence they fall onto the funnel 90.

In the funnel 90, the slowly rotating hollow screw 97 mixes the liquid and solids together, and the tip 98 prevents them from bridging the pump inlet 93. The pump E, operated by the motor H, sends the mixture 104 through the pipe 105 to the remainder of the system.

Variation of the speed of the motor H controls the speed of the pump E and of the metering screws 66 for the solid components of the mixture 104. Also, by the effect of the pump speed on the liquid level in the float chamber 41, the valve 54 meters the liquid component.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A mixing and feeding device for an aseptic canning system or the like, including incombination: a liquid-metering chamber having a bottom inlet, a side outlet, a float, and a butterfly valve in said inlet controlled by said float; means for continuously supplying a liquid food component to said inlet; a mixing chamber connected to said side outlet by a substantially horizontal conduit and having an open upper end and a bottom outlet; means for wiping said outlet of said mixing chamber; means for emptying solid components into the open upper end of said mixing chamber; and a pump having its inlet at the outlet from said mixing chamber.

2. The device of claim 1 wherein the inlet to said mixing chamber from said horizontal conduit is provided with an inclined deflection means extending upwardly and into said mixing chamber from a lower end in said conduit, for causing said liquid to flow first upwardly and then downwardly, carrying with it solids that tend to stay near the top of the liquid in said mixing chamber.

3. The device of claim 1 having means for changing the position of said deflection plate along the axis of said horizontal conduit, to accommodate different flow rates of liquid.

4. A mixing and feeding device for an aseptic canning system or the like, including in combination: a liquid-metering chamber having a bottom inlet, a side outlet, a float, and a butterfly valve in said inlet controlled by said float; means for continuously supplying a liquid food component to said inlet; a mixing chamber connected to said side outlet by a substantially horizontal conduit and having an open upper end and a bottom outlet and a hollow screw with an offset tip at its lower end wiping said outlet of said mixing chamber to prevent bridging of solids at said outlet; means for emptying solid components into the open upper end of said mixing chamber; and a pump having its inlet at the outlet from said mixing chamber.

5. The device of claim 4 wherein a deflection plate is provided near the inlet to said mixing chamber from said horizontal conduit, said plate being generally elliptical with a straight upper edge and extending up from the bottom of said conduit and inclined toward the center of the mixing chamber.

6. The device of claim 5 wherein a slotted plate is slidably mounted in the bottom of said conduit and said deflection plate is secured thereto and moves therewith, and fastening means passing through said slot for holding said slotted plate in any of many different positions.

7. A mixing and feeding device for an aspetic canning system or the like, including in combination: a liquid-metering chamber having a bottom inlet, a side outlet, a float, and a butterfly valve in said inlet controlled by said float for metering the flow of fluid in response to its level in said liquid metering chamber; means for continuously supplying a liquid food component to said inlet; a mixing chamber connected to said side outlet by a substantially horizontal conduit lying fully below the level of said float and having an open upper end to bottom outlet and a helical rotating member with an offset disbridging tip at its lower end wiping said outlet of said mixing chamber; means for metering solid components into the open upper end of said mixing chamber; and a pump having its inlet at the outlet for said mixing chamber.

8. The device of claim 4 wherein a deflection plate is providing near the inlet to said mixing chamber from said horizontal conduit, said plate lying below the level of said float and being generally elliptical with a flat upper edge and extending up from the bottom of said conduit and inclined toward the center of the mixing chamber.

9. A feeding device for feeding a mixing of solids and liquid in an aseptic canning system or the like, including in combination: a funnel-shaped chamber having a side inlet, an open upper end and a bottom outlet, a substantially horizontal conduit connected to said inlet, means for supplying fluid to said conduit and thereby to said chamber, and means for supplying fluid having float means for controlling the level of said fluid in said chamber at a level above said inlet, and a hollow helical member extending vertically along the axis of said chamber and having an offset tip at its lower end wiping said outlet of said chamber for disbridging solids therefrom.

References Cited by the Examiner

UNITED STATES PATENTS

| 391,907 | 10/88 | Merrill | 222—240 X |
| 1,713,886 | 5/29 | Benzon | 222—149 |
| 2,685,388 | 8/54 | Steiner | 222—148 X |
| 3,047,034 | 6/62 | Sassmannshasen et al. | 222—241 X |

FOREIGN PATENTS

| 507,866 | 9/30 | Germany. |
| 689,456 | 3/53 | Great Britain. |
| 91,847 | 8/59 | Netherlands. |

RAPHAEL M. LUPO, *Primary Examiner.*

UNITED STATES PATENT OFFICE
CERTIFICATE OF CORRECTION

Patent No. 3,212,674 October 19, 1965

William McKinley Martin

It is hereby certified that error appears in the above numbered patent requiring correction and that the said Letters Patent should read as corrected below.

Column 1, line 28, for "of having" read -- and having --; line 31, for "use" read -- used --; line 62, for "of elevation" read -- in elevation --; column 3, line 68, for "food particles" read -- the food particles --; line 71, for "screws" read -- screw --; column 7, line 5, for "rotation" read -- rotating --; line 7, for "balancing" read -- blanching --; line 35, for "incombination" read -- in combination --; column 8, lines 26 and 27, for "to bottom outlet" read -- a bottom outlet --; line 31, for "outlet for" read -- outlet from --; line 39, for "mixing" read -- mixture --; line 45, for "and means" read -- said means --.

Signed and sealed this 11th day of October 1966.

(SEAL)

Attest:

ERNEST W. SWIDER
Attesting Officer

EDWARD J. BRENNER
Commissioner of Patents